United States Patent [19]
Berg

[11] 3,786,827
[45] Jan. 22, 1974

[54] FLOW CONTROL VALVE
[75] Inventor: Lawrance F. Berg, Lockport, Ill.
[73] Assignee: Caterpillar Tractor Co., Peoria, Ill.
[22] Filed: Mar. 16, 1973
[21] Appl. No.: 342,060

[52] U.S. Cl............... 137/109, 137/625.48, 91/436
[51] Int. Cl............................................ F16k 11/07
[58] Field of Search . 137/109, 625.48; 91/415, 440, 91/436, 437, 445

[56] References Cited
UNITED STATES PATENTS

| | | | |
|---|---|---|---|
| 2,590,454 | 3/1952 | Pilch | 91/420 |
| 2,976,878 | 3/1961 | Smilges | 91/436 X |
| 3,138,884 | 6/1964 | Hein et al. | 91/436 X |
| 3,239,020 | 3/1966 | Morris et al. | 74/720.5 X |
| 3,482,600 | 12/1969 | Hodgson | 91/436 X |
| 3,568,707 | 3/1971 | Shore | 91/436 X |
| 3,604,313 | 9/1971 | Fruehauf | 91/436 X |
| 3,654,835 | 4/1972 | Sievenpiper | 91/436 |

Primary Examiner—William R. Cline
Attorney, Agent, or Firm—Paul J. Winters

[57] ABSTRACT

A flow control valve is used with a hydraulic cylinder having a reciprocable piston and a rod connected thereto. The valve includes a valving spool which defines a relatively stable center position blocking off hydraulic fluid flow to the rod end of the cylinder, but not interfering with the flow to the head end of the cylinder. Upon application of pressurized hydraulic fluid to the valve through a line connected to the valve, the valving spool shifts in one direction to allow fluid flow to the rod end of the cylinder, retracting the rod. Upon application of fluid pressure to the head end of the cylinder, the valving spool shifts in the other direction to allow open communication between the rod end and the head end of the cylinder, so that fluid flows from the rod end to the head end of the cylinder, resulting in a super-charged condition at the head end of the cylinder and consequent rapid extension of the rod.

11 Claims, 1 Drawing Figure

PATENTED JAN 22 1974    3,786,827
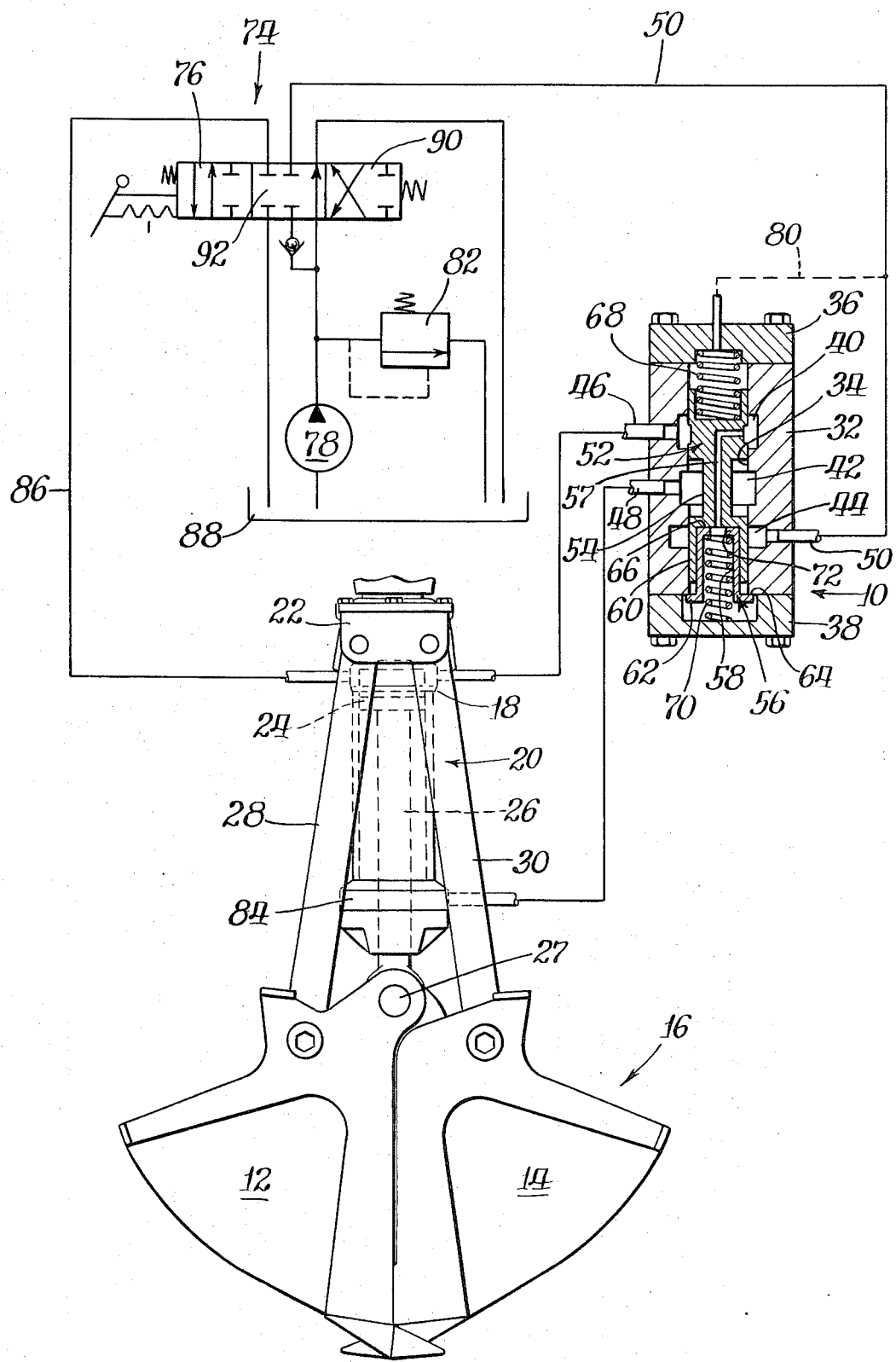

FLOW CONTROL VALVE

BACKGROUND OF THE INVENTION

This invention relates to flow control valves, and more particularly, to a valve including a valving spool which defines a relatively stable center position, and which is movable in either direction from this center position to determine flow of hydraulic fluid in cooperation with a hydraulic cylinder.

In flow control valves of the type which incorporate a spool which is reciprocable in one and the other direction within a bore, such spool is generally held in a centered position by springs disposed on either end of the spool. The spool is normally centered by a balance of forces between these springs. (See, for example, U.S. Pat. No. 2,590,454 to Pilch, and U.S. Pat. No. 2,890,683 to Pilch.)

It will be understood that this type of spool arrangement is very sensitive to even the smallest of forces on the spool which will cause the spool to shift. Such sensitivity to force may in some cases be undesirable, it being required that a more stable centered position of the spool exists.

Of more general interest in this area are U.S. Pat. No. 2,994,345 to Strader, U.S. Pat. No. 3,239,020 to Morris et al., and German Pat. Specification No. 672,643.

SUMMARY OF THE INVENTION

It is an object of this invention to provide a flow control valve incorporating a spool which is capable of shifting from a centered position in one and the other direction to provide desired fluid flow therethrough.

It is a further object of this invention to provide a flow control valve which, while fulfilling the above object, includes means for defining a relatively stable center position of the valving spool thereof.

It is a still further object of this invention to provide a flow control valve which, while fulfilling the above objects, is extremely simple in design and reliable and effective in operation.

Broadly stated, the inventive flow control valve is designed for use in cooperation with first, second, and third fluid lines associated with a fluid pressure source, and comprises a valve body defining an internal bore and first and second end portions, the first, the second, and the third lines individually communicating with the bore. A valving spool is disposed in the bore and is reciprocable therein toward the first end portion and away from the second end portion, and toward the second end portion and away from the first end portion. The valving spool defines passage means. The valving spool is movable to a first position wherein only the first and second lines are in communication with each other through the passage means, the valving spool substantially blocking off the third line therefrom. The valving spool is movable to a second position where there is substantially no communication between any of the first, second, and third lines, the valving spool substantially blocking each of the lines off from the others. The valving spool is movable to a third position wherein the second and third lines are in communication with each other through the passage means, the valving spool substantially blocking off the first line therefrom. First resilient means are disposed within the bore adjacent the first end portion for urging the valving spool toward said third position. A single retainer member is disposed within the bore between the second end portion and the valving spool, and positioned to contact the valving spool so that movement of the retainer member away from the second end portion moves the valving spool toward its first position. The retainer member is configured to contact a stepped portion defined by the valve body as part of the bore when moved away from the second end portion to determine, with the first resilient means, upon such contact, the second position of the valving spool. Second resilient means are disposed within the bore adjacent the second end portion for urging the retainer member away from the second end portion and providing such force, in relation to the first resilient means, to normally position the valving spool in its second position. The valving spool is movable to its first position from the second position against the resiliency of the first resilient means, and the valving spool is movable to its third position from the second position against the resiliency of the second resilient means, but being relatively stably held in said second position. Means are included for selectively moving the valving spool to its first position, and means are included for selectively moving the valving spool to its third position.

BRIEF DESCRIPTION OF THE DRAWING

These and other objects of the invention will become apparent from a study of the following specification and drawing, said drawing being a schematic view of a system incorporating the inventive flow control valve, which is shown in section in that drawing.

DESCRIPTION OF THE PREFERRED EMBODIMENT

As shown in the drawing, a flow control valve 10 is part of a hydraulic system for opening and closing the jaws 12,14 of a clamshell bucket 16. The head end 18 of a cylinder 20 is mounted to a bracket 22 connected to a vehicle (now shown), and has a piston 24 reciprocable therein and a rod 26 extending downwardly from piston 24. The rod 26 is pivotally connected to both jaws 12,14 by means of a pin 27, so that extension of the rod 26 opens the jaws 12,14, and retraction of the rod 26 closes the jaws 12,14, links 28,30 interconnecting these respective jaws 12,14, with the bracket 22 to guide such pivoting motion.

The valve 10 includes a valve body 32 defining an internal bore 34 and first and second end portions 36,38. The valve body 32 defines as a part of the bore 34 thereof first, second, and third annular channels 40,42,44 respectively. First, second and third lines 46,48,50 extend from outside the valve body 32 therethrough to communicate with these channels 40,42,44 respectively, so that each line individually communicates with the bore 34.

A valving spool 52 is disposed in the bore 34 and is reciprocable therein toward the first end portion 36 and away from the second end portion 38, and toward the second end portion 38 and away from the first end portion 36. The valving spool 52 itself defines passage means 54 consisting of an annular channel.

A retainer member 56 is disposed within the bore 34 between the end portion 38 and the spool 52. The retainer member 56 includes an inner sleeve portion 58 slidably disposed within an outer sleeve portion 60 defined by the valving spool 52. The retainer member 56 defines an outwardly extending annular rib 62 positioned to contact an annular stepped portion 64 defined by the valve body 32 when moved away from the end portion 38. The end 66 of the retainer member 56 within the outer sleeve portion 60 is positioned to contact the valving spool 52 so that movement of the retainer member 56 away from the end portion 38 moves the spool 52 toward the first end portion 36.

A helical spring 68 is disposed within the bore 34 adjacent the end portion 36 and between the end portion and the spool 52. A helical spring 70 is disposed within the bore 34 adjacent the end portion 38 between the end portion 38 and an inwardly facing annular facing rib 72 defined by the retainer member 56 for urging the retainer member 56 away from the end portion 38. The valving spool 52 defines therethrough a pilot passage 57 which communicates with the annular channel 40 and extends through the spool 52 to communicate with the bore 34 adjacent the second end portion 38.

The helical springs 68,70 are chosen so as to normally position the spool 52 as shown in the drawing. That is, spring 70 is chosen as stronger than spring 68, so that spring 70 will tend to move the retainer member 56 and the spool 52 therewith upward to the position shown against the resiliency of spring 68 until rib 62 contacts shoulder 64. In such normal position, there is substantially no communication between any of the lines 46,48,50 because the valving spool 52 substantially blocks each of the lines off from the others.

It will be seen that the valving spool 52 is movable upwardly to a position wherein the lines 46,48 are in communication with each other through the annular channels 40,54,42, with the spool 52 substantially blocking off the line 50 therefrom.

Similarly, the valving spool 52 is movable downwardly to a position wherein the lines 48,50 are in communication with each other through the annular channels 42,54,44 with the spool 52 substantially blocking off the line 46 therefrom.

The spring 70 tends to urge the valving spool 52 toward the upward position, and the spring 68 tends to urge the valving spool 52 toward the downward position. The valving spool 52, it will be seen, is movable to its upward position from the normal position in the drawing against the resiliency of the helical spring 68, and the valving spool 52 is movable to its downward position from the normal position shown in the drawings against the resiliency of the helical spring 70, but is relatively stably held in the normal, intermediate position.

In operation, a three-position manually controlled valve 74 has an actuated position 76 which directs pressurized hydraulic fluid from a pump 78 through line 50 to the annular channel 44, and to an additional branch line 80 communicating with the line 50 and extending through the end portion 36 and communicating with the bore 34 adjacent the end portion 36. The pump 78 is provided with a conventional relief valve 82 to relieve excessive pressure.

Application of pressurized fluid through line 80 causes valving spool 52 to shift in a downward direction so that channels 42 and 44 are in communication with channel 54. Thus, lines 48 and 50 are in communication, and pressurized fluid is supplied therethrough to the rod end 84 of the cylinder 20 to cause retraction of the piston rod 26, closing jaws 12,14. During such retraction, hydraulic fluid is expelled from the head end 18 of the cylinder 20 through a line 86 communicating therewith through the control valve 74 to a tank 88.

Moving control valve 74 the other way to bring actuated position 90 into play directs pressurized fluid through line 86 to the head end 18 of the cylinder 20. The pressure is also applied to line 46 connected with the head end 18 of the cylinder 20, and to annular channel 40. The pilot passage defined by spool 52 applies this pressure to the bore adjacent the end portion 38 at the lower side of the valving spool 52 to shift the spool 52 in an upward direction, the sleeve portion 60, of course, sliding over the sleeve portion 58 as this occurs. In such upward position, the annular channels 40,54,42 are in communication, permitting hydraulic fluid being expelled from the rod end 84 of the cylinder 20 to combine with the hydraulic fluid being introduced into the head end 18 of the cylinder 20 to provide a more rapid extension of the rod 26 than would be possible by supplying the amount of fluid introduced solely by the pump 78, resulting in extremely rapid opening of the jaws 12,14.

With the control valve 74 in its central position 92, the lack of hydraulic pressure in either the pilot passage 57 or line 80 permits the springs 68,70 to urge the spool 52 to its central position. In that position, fluid pressure which may exist in line 48 due to the weight and load of the bucket 16 is prevented from escaping to either the head end 18 of the cylinder or to the tank 88. This prevents extension of the rod 26 and the opening of the bucket 16.

What is claimed is:

1. A flow control valve for use in cooperation with first, second, and third fluid lines associated with a fluid pressure source, comprising:

a valve body defining an internal bore and first and second end portions, the first, second, and third lines individually communicating with the bore;

a valving spool disposed in the bore and reciprocable therein toward the first end portion and away from the second end portion, and toward the second end portion and away from the first end portion;

the valving spool defining passage means;

the valving spool being movable to a first position wherein the first and second lines are in communication with each other through the passage means, with the valving spool substantially blocking off the third line therefrom;

the valving spool being movable to a second position wherein there is substantially no communication between any of the first, second, and third lines, the valving spool substantially blocking each of these lines off from the others;

the valving spool being movable to a third position wherein the second and third lines are in communication with each other through the passage means, with the valving spool substantially blocking off the first line therefrom;

first resilient means disposed within the bore adjacent the first end portion for urging the valving spool toward said third position;

a single retainer member disposed within the bore between the second end portion and the valving spool, and positioned to contact the valving spool so that movement of the retainer member away from the second end portion moves the valving spool toward its first position;

the retainer member being configured to contact a stepped portion defined by the valve body as part of the bore when moved away from the second end portion to determine, with the first resilient means, upon such contact, the second position of the valving spool;

second resilient means disposed within the bore adjacent the second end portion for urging the retainer member away from the second end portion and providing such force, in relation to the first resilient means, to normally position the valve spool in its second position;

the valving spool being movable to its first position from the second position against the resiliency of the first resilient means, the valving spool being movable to its third position from the second position against the resiliency of the second resilient means, but being relatively stably held in said second position;

means for selectively moving the valving spool to its first position; and means for selectively moving the valving spool to its third position.

2. The flow control valve of claim 1 wherein the passage means defined by the valving spool comprise an annular channel defined by said valving spool.

3. The flow control valve of claim 2 wherein the means for selectively moving the valving spool to its first position comprise fluid pressure applied from the fluid pressure source to the first line, and wherein the means for selectively moving the valving spool to its third position comprise fluid pressure applied from the fluid pressure source to the third line.

4. The flow control valve of claim 3 wherein the retainer member comprises an inner sleeve portion slidably disposed within an outer sleeve portion defined by the valving spool, and further comprising an annular rib configured to contact said stepped portion defined by the valve body.

5. The flow control valve of claim 4 wherein the first and second resilient means comprise first and second helical springs respectively.

6. The flow control valve of claim 2 wherein the valve body defines as part of the internal bore thereof first, second, and third annular channels communicating with the first, second, and third lines respectively, the communication between the first and second lines with the valving spool in the first position taking place through the first annular channel defined by the valve body, the annular channel defined by the valving spool, and the second annular channel defined by the valve body, the communication between the second and third lines with the valving spool in the third position taking place through the second annular channel defined by the valve body, the annular channel defined by the valving spool, and the third annular channel defined by the valve body.

7. The flow control valve of claim 6 wherein the means for selectively moving the valving spool to its first position comprise fluid pressure applied from the fluid pressure source to the first line, and wherein the means for selectively moving the valving spool to its third position comprise fluid pressure applied from the fluid pressure source to the third line.

8. The flow control valve of claim 7 wherein the means for selectively moving the valving spool to its first position further comprise a pilot passage defined within the valving spool and communicating with the first annular channel and extending through the valving spool and communicating with the bore adjacent the second end portion.

9. The flow control valve of claim 8 wherein the means for selectively moving the valving spool to its second position further comprise an additional line communicating with the third line and extending through the first end portion and communicating with the bore adjacent the first end portion.

10. The flow control valve of claim 9 wherein the retainer member comprises an inner sleeve member slidably disposed within an outer sleeve portion defined by the valving spool, and further comprising an annular rib configured to contact said stepped portion defined by the valve body.

11. The flow control valve of claim 10 wherein the first and second resilient means comprise first and second helical springs respectively.

* * * * *